United States Patent [19]

Hasegawa et al.

[11] 3,875,627

[45] Apr. 8, 1975

[54] METHOD OF MANUFACTURING A TARGET PLATE FOR A COLOR TELEVISION CAMERA TUBE

[75] Inventors: Tadashi Hasegawa, Kyoto; Hirofumi Tanaka, Takatsuki, both of Japan

[73] Assignee: Matsushita Electronics Corporation, Osaka, Japan

[22] Filed: Mar. 20, 1973

[21] Appl. No.: 343,184

[30] Foreign Application Priority Data

Mar. 24, 1972 Japan ................................ 47-30090

[52] U.S. Cl. ............... 29/25.13; 29/25.11; 313/372

[51] Int. Cl. ............................................ H01j 9/18

[58] Field of Search ............ 29/25.13, 25.11, 25.14, 29/25.17, 25.18; 96/36.1, 36; 313/65 R, 65 LF, 92 LF, 92 BI, 365, 371, 372, 89, 94

[56] References Cited

UNITED STATES PATENTS

| | | | |
|---|---|---|---|
| 2,870,010 | 1/1959 | Sadowsky et al. | 96/36.1 X |
| 3,226,246 | 12/1965 | Vermeulen et al. | 96/36.1 X |
| 3,688,143 | 8/1972 | Lieb et al. | 313/65 LF X |

*Primary Examiner*—Roy Lake
*Assistant Examiner*—James W. Davie
*Attorney, Agent, or Firm*—Stevens, Davis, Miller & Mosher

[57] ABSTRACT

A method of manufacturing a target plate for a color television camera tube comprising a face plate including a fiber plate and a photoconductive target electrode having nonconductive portions of a stripe shape and provided on the inner surface of the face plate, comprising the steps of successively forming a transparent conductive film and a photoresist film on the inner surface of the face plate, setting an optical mask on the outer surface of the face plate, irradiating ultraviolet rays on the photoresist film through the photomask and the face plate to selectively expose the photoresist film to the ultraviolet rays and developing the photoresist film to obtain an apertured photoresist film to form the nonconductive portions.

2 Claims, 5 Drawing Figures

METHOD OF MANUFACTURING A TARGET PLATE FOR A COLOR TELEVISION CAMERA TUBE

This invention relates to a method of manufacturing a target plate for a color television camera tube.

Figure 1:
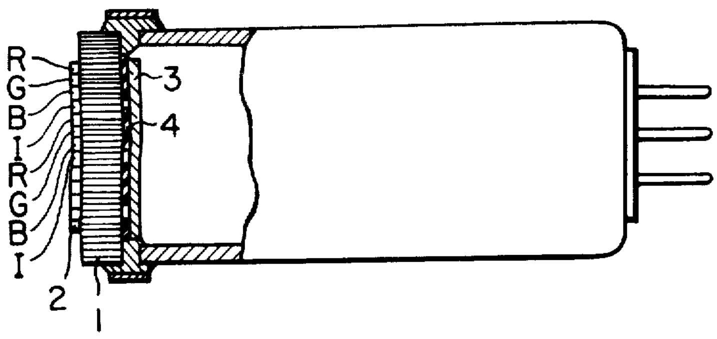
FIG. 1 PRIOR ART
Figure 2:
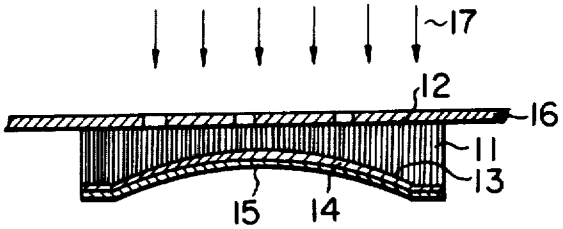
Figure 3:
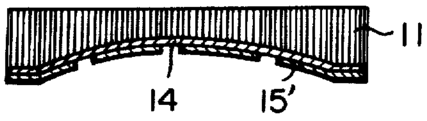
Figure 4:
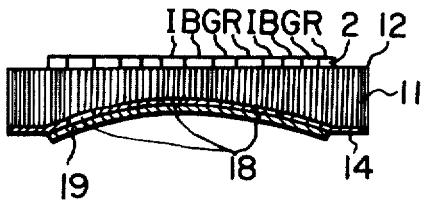

Hereinbelow, a description will be made in connection with the accompanying drawings, in which:

FIG. 1 is a partially broken side view of a conventional color television camera tube; and FIG. 2 to 4 are partial longitudinal cross-sections for illustrating the manufacturing method according to this invention.

Figure 5:
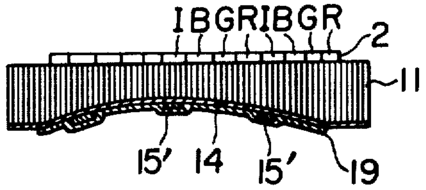

FIG. 5 is a partial longitudinal cross-section for illustrating another practical embodiment according to this invention. 79 Conventionally, a color television camera tube as shown in FIG. 1 is usually used for picking up a color image with a single television camera tube. In this color camera tube, a face plate 1 is formed of an assembly of optical fibers, i.e., a fiber plate, the outer surface of which is provided with a stripeshaped optical filter 2 including successively disposed stripes of red R, green G, and blue B for decomposing a color and a strip I for generating an index signal, and the inner surface of which is provided with a transparent conductive film 4 and a photoconductive film 3 formed thereon. The transparent conductive film 4 has cut portions or insulating portions in registration with the stripes I for generating the index signal so that the portions of the photoconductive film corresponding to the stripes I are free from the application of signal voltages. Usually, the construction of the face plate 1, the photoconductive film 3 and the transparent film 3 is denoted as a target for the color television camera tube.
Usually, the construction of the face plate 1, the photoconductive film 3 and the transparent film 4 is denoted as a target plate for the color television camera table.

By the use of such a color television camera, a video signal decomposed into three components of red, green and blue and an index signal can be derived successively from a common signal electrode by scanning with an electron beam. In the above structure, however, since shear distortions of 10 to 30 microns or more usually exist in the fiber plate forming the face plate 1, a faithful correspondence may not be achieved between the image projected on the optical filter 2 and the image led to the photoconductive film 3, and partial offset may occur in the reproduced image to generate color offset.

Further, it is necessary to select the width of each stripe in the optical filter equal to or below 20 microns, and this means that the resolution of the tube should be good all over the scanning surface for stably deriving the index from such fine stripes. In reality, however, there is a problem that the resolution might be low especially at the peripheral portions to cause color offset.

It has been proposed conventionally for improving the resolution in the peripheral portions to form the inner surface of the face plate in a concave shape according to the focal surface of the electron beam. In this case, the formation of the film having insulating stripes on a concave surface is very difficult.

An object of this invention is to provide a method of manufacturing a target plate for a color television camera tube which can solve the conventional drawbacks and more particularly to provide a method of manufacturing a color television camera tube which can prevent the generation of color offset due to shear distortions in the fiber plate forming a face plate.

According to an embodiment of this invention, there is provided a method of manufacturing a target plate for a color television camera tube comprising the steps of forming a transparent conductive film and a photoresist film successively on the inner surface of a face plate made of a fiber plate; selectively exposing said photoresist film with light transmitted through an optical mask disposed on the outer surface of said face plate and developing said photoresist film to form narrow apertures in the photoresist film; etching said transparent conductive film using said apertured photoresist film as an etch mask to form stripe-shaped narrow holes in said transparent conductive film; forming a photoconductive film uniformly on said transparent conductive film having the narrow-holes; and disposing an optical filter having stripes for generating an index signal corresponding to said narrow holes on the outer surface of said face plate. According to the above method, a photoconductive target electrode having nonconductive stripes is formed through selectively exposing a photoresist film coated on the inner surface of a face plate through the face plate and an optical mask disposed on the outer surface of the face plate. Thus, even if there exist shear distortions and/or other distortions in the fiber plate forming a face plate, they are absorbed by the change of shapes of the nonconductive stripes formed from the photoresist film. Therefore, the generation of color offset due to such distortions cannot occur. According to this invention, the formation of nonconductive stripes can be achieved easily even on a concave inner surface of a face plate. It is to be noted here that in the conventional method, the exposure of a photoresist film is made from the inner side of a tube and the effects of said distortions cannot be eliminated.

Now, this invention will be described in more detail on a preferred embodiment in conjunction with the accompanying drawings.

FIGS. 2 to 4 are partial cross-sections of a face plate for illustrating the various steps of the present method. In FIG. 2, a face plate 11 is formed of a fiber plate and has a flat outer surface 12 and a concave inner surface 13 shaped after the focal surface of the electron beam. The inner surface 13 is coated with a uniform transparent conductive film 14 made of tin oxide and formed by a known method. A photoresist film 15 made of a material such as those known by the trade name "KPR" or "KTFR" of Eastman Kodak is further coated on the transparent conductive film 14. On the outer surface 12 of the face plate 11 is disposed an optical mask 16 which has a opaque pattern corresponding to the stripes I for generating the index signal.

Parallel light 17 having a wavelength shorter than 3,500 A emitted from a light source and collimated through a collimating means are projected to said structure perpendicularly to the outer surface 12 from the outside. Then, the light 17 strikes the photoresist film 15 through the optical mask 16, the face plate 11 and the transparent conductive film 14 to selectively expose the photoresist film 15. When such exposed photoresist film is developed, there is formed a grooved photoresist film 15′ having removed stripe portions corresponding to the stripes I for generating the index signal on the transparent conductive film 14 as shown in FIG. 3. Next, using this grooved photoresist film 15′ as an etching mask the transparent conductive film 14 is subjected to etching. Then, removed portions of a stripe shape, i.e., narrow holes 18, are formed in the transparent conductive film 14 as shown in FIG. 4. After this etching process, the etching mask 15' is removed and a uniform photoconductive film 19 is formed of antimony trisulfide, lead monoxide, etc. Then, an optical filter 2 is bonded on the outer surface 12 so that the stripes I in the filter are registered with said narrow holes 18.

In the above embodiment, an apertured photoresist film 15' is used as an etching mask and then removed. Alternatively, the photoresist film may be formed into a stripe shape corresponding to the stripes I and left in the tube. In this case, there is no need of etching the transparent conductive film and a photoconductive film is formed uniformly on the transparent conductive film provided with said stripe-shaped photoresist film, as shown in FIG. 5. Further, when an appropriate optical system is provided outside the tube, the optical filter may not be brought into contact with the outer surface of the face plate and may be disposed in separation from the outer surface of the face plate.

What we claim is:

1. A method of manufacturing a target plate for a color television camera tube comprising the steps of:

forming a transparent conductive film and a photoresist film successively on the inner surface of a face plate made of a fiber plate;

selectively exposing said photoresist film to light beams transmitted through said face plate and an optical mask disposed on the outer surface of said face plate and developing said photoresist film to form narrow apertures in the photoresist film;

etching said transparent conductive film using said apertured photoresist film as an etch mask to form stripe-shaped narrow holes in said transparent conductive film;

removing said photoresist film;

forming a photoconductive film uniformly on said transparent conductive film having the narrow holes; and disposing an optical filter having stripes for generating an indexing signal corresponding to said narrow holes on the outer surface of said face plate.

2. A method of manufacturing a target plate for a color television camera tube comprising the steps of:

forming a transparent conductive film and a photoresist film successively on the inner surface of a face plate made of a fiber plate;

selectively exposing said photoresist film to light beams transmitted through said face plate and an optical mask disposed on the outer surface of said face plate and developing said photoresist film to form a stripe-shaped photoresist film;

forming a photoconductive film uniformly on said transparent conductive film coated with the photoresist film; and disposing an optical filter having stripes for generating an indexing signal corresponding to said stripe-shaped photoresist film on the outer surface of said face plate.

* * * * *